(12) United States Patent
He et al.

(10) Patent No.: US 12,316,129 B1
(45) Date of Patent: May 27, 2025

(54) ADAPTIVE CONTROL ELECTROMAGNETIC INDUCTION ENERGY HARVESTING METHOD AND SYSTEM FOR A POWER TRANSMISSION LINE

(71) Applicant: STATE GRID SHANGHAI MUNICIPAL ELECTRIC POWER COMPANY, Shanghai (CN)

(72) Inventors: Bing He, Shanghai (CN); Lingjing Hu, Shanghai (CN); Xing Miao, Shanghai (CN); Ming Zhang, Shanghai (CN); Bin Xu, Shanghai (CN); Jiaying Mao, Shanghai (CN); Wei Zhang, Shanghai (CN); Weijun Chen, Shanghai (CN); Yiming Fan, Shanghai (CN); Yuhao Li, Shanghai (CN); Yunwei Lu, Shanghai (CN)

(73) Assignee: STATE GRID SHANGHAI MUNICIPAL ELECTRIC POWER COMPANY, Shanghai (CN)

( * ) Notice: Subject to any disclaimer, the term of this patent is extended or adjusted under 35 U.S.C. 154(b) by 0 days.

(21) Appl. No.: 19/025,805

(22) Filed: Jan. 16, 2025

Related U.S. Application Data

(63) Continuation of application No. PCT/CN2024/110369, filed on Aug. 7, 2024.

(30) Foreign Application Priority Data

Mar. 26, 2024 (CN) .......................... 202410346976.8

(51) Int. Cl.
*H02J 50/00* (2016.01)
*H02J 50/10* (2016.01)

(52) U.S. Cl.
CPC .......... *H02J 50/005* (2020.01); *H02J 50/001* (2020.01); *H02J 50/10* (2016.02)

(58) Field of Classification Search
CPC .......... H02J 50/001; H02J 50/005; H02J 50/10
See application file for complete search history.

(56) References Cited

U.S. PATENT DOCUMENTS

| | | | |
|---|---|---|---|
| 4,295,795 A * | 10/1981 | Gass ...................... | E21B 43/123 137/155 |
| 10,283,301 B2 * | 5/2019 | Schuster .............. | H01H 71/402 |

(Continued)

FOREIGN PATENT DOCUMENTS

| CN | 101442222 A | 5/2009 |
|---|---|---|
| CN | 101447699 A | 6/2009 |

(Continued)

OTHER PUBLICATIONS

Z. Lu et al., A design method of CT draw-out energy power supply with wide operating range current, Modern Electronics Technique, Mar. 2020, 5 pages, vol. 43 No. 6, DOI:10.16652/j.issn.1004-373x.2020.06.030.

*Primary Examiner* — Rexford N Barnie
*Assistant Examiner* — Joseph N Inge
(74) *Attorney, Agent, or Firm* — MOSER TABOADA

(57) ABSTRACT

Provided are an adaptive control electromagnetic induction energy harvesting method and system for a power transmission line. The method includes acquiring a first electromagnetic induction electromotive force based on an electromagnetic induction energy harvesting device secured to the power transmission line; when the first electromagnetic induction electromotive force is less than an operating electromagnetic induction electromotive force, controlling the electromagnetic induction energy harvesting device to adaptively control a magnetic core unit to perform extension or retraction in a coil unit based on the first electromagnetic induction electromotive force to obtain a second electromagnetic induction electromotive force; performing filtering and rectification processing and voltage conversion process- (Continued)

ing on at least one of the first electromagnetic induction electromotive force or the second electromagnetic induction electromotive force to obtain an electromagnetic induction output voltage; and performing powering processing or charging processing on an electrical device based on the electromagnetic induction output voltage.

13 Claims, 3 Drawing Sheets

(56) References Cited

U.S. PATENT DOCUMENTS

| | | | | |
|---|---|---|---|---|
| 2013/0093542 | A1* | 4/2013 | Sora | H01H 47/22 335/192 |
| 2015/0280538 | A1* | 10/2015 | Seok | H02K 35/02 310/25 |
| 2019/0135113 | A1* | 5/2019 | Koo | B60L 53/126 |
| 2019/0198218 | A1 | 6/2019 | Cis et al. | |
| 2020/0119619 | A1* | 4/2020 | Krupenkin | H02K 35/04 |
| 2024/0088707 | A1 | 3/2024 | Save et al. | |
| 2024/0337180 | A1* | 10/2024 | Neate | E21B 44/00 |

FOREIGN PATENT DOCUMENTS

| | | |
|---|---|---|
| CN | 204696771 U | 10/2015 |
| CN | 106849369 A | 6/2017 |
| CN | 206323222 U | 7/2017 |
| CN | 107068370 A | 8/2017 |
| CN | 110704962 A | 1/2020 |
| CN | 110829619 A | 2/2020 |
| CN | 112600287 A | 4/2021 |
| CN | 112968640 A | 6/2021 |
| CN | 112994253 A | 6/2021 |
| CN | 114865802 A | 8/2022 |
| CN | 115528791 A | 12/2022 |
| CN | 115714474 A | 2/2023 |
| CN | 117955257 A | 4/2024 |
| WO | WO 2023/226162 A1 | 11/2023 |

* cited by examiner

ADAPTIVE CONTROL ELECTROMAGNETIC INDUCTION ENERGY HARVESTING METHOD AND SYSTEM FOR A POWER TRANSMISSION LINE

CROSS-REFERENCE TO RELATED APPLICATIONS

This is a continuation of International Patent Application No. PCT/CN2024/0110369, filed on Aug. 7, 2024, which claims priority to Chinese Patent Application No. 202410346976.8 filed with the China National Intellectual Property Administration (CNIPA) on Mar. 26, 2024, the disclosures of which are incorporated herein by reference in their entireties.

TECHNICAL FIELD

The present application relates to the field of power monitoring auxiliary equipment, for example, an adaptive control electromagnetic induction energy harvesting method and system for a power transmission line.

BACKGROUND

The importance of the safe operation of power transmission lines and the increasing safety hazards associated with accidents necessitate the installation of numerous secondary low-voltage devices, such as monitoring devices and control devices, on power cables and in their surrounding environment to ensure the normal and safe operation of the power cables. Due to the long transmission distances of power cables, the diverse methods of power transmission, and the complex environment, supplying power to the secondary low-voltage devices of power transmission lines has become a major challenge. Therefore, developing a power supply with good performance that is suitable for various working environments such as outdoor conditions and relatively easy to maintain and install, applying the power supply to the online monitoring of the status parameters of power cables, and ensuring the reliability of the power supply are essential for guaranteeing the safe production and safe power supply of a power system.

CN115528791A discloses an adaptive energy harvesting method, system, and device for an induction energy harvesting circuit. Based on the real-time voltage of an energy storage capacitor, the first or second voltage threshold is determined as the discharge voltage threshold. Specifically, when the real-time voltage of the energy storage capacitor is lower than the full charge voltage, that is, when the capacitor is not fully charged, the energy harvesting output of the induction energy harvesting circuit does not exceed the required power for the working load. At this point, a controller controls the first voltage threshold to serve as the discharge voltage threshold, which is equivalent to increasing the discharge voltage threshold. This allows the induction energy harvesting circuit to harvest more energy to charge the energy storage capacitor, enabling the energy storage capacitor to supply power to the working load during the energy discharge of the induction energy harvesting circuit. When the real-time voltage of the energy storage capacitor is greater than or equal to the full charge voltage, that is, when the capacitor is fully charged, the energy harvesting output of the induction energy harvesting circuit exceeds the required power for the working load, and the controller controls the second voltage threshold as the discharge voltage threshold, which is equivalent to reducing the discharge voltage threshold. This allows the induction energy harvesting circuit to release energy at a lower output voltage of the power supply terminal, preventing excessive current and overload of the induction energy harvesting circuit, thereby achieving adaptive energy harvesting and releasing and automatic protection for the induction energy harvesting circuit. However, due to the inability to adaptively adjust the structure between the magnetic core and coil, the induction energy harvesting circuit is prone to magnetic saturation and a short magnetic induction time, making it impossible to harvest energy through electromagnetic induction for a longer period to obtain more electrical energy.

SUMMARY

The present application provides an adaptive control electromagnetic induction energy harvesting method and system for a power transmission line. In the method and system, an electromagnetic induction energy harvesting device is secured to the power transmission line, and a magnetic core unit is adaptively controlled to perform extension or retraction in a coil unit to acquire an electromagnetic induction electromotive force, and powering processing or charging processing is performed on an electrical device.

An adaptive control electromagnetic induction energy harvesting method for a power transmission line includes acquiring a first electromagnetic induction electromotive force based on an electromagnetic induction energy harvesting device secured to the power transmission line, where the electromagnetic induction energy harvesting device includes a magnetic core unit, a processor unit, a voltage protection unit, a filtering and rectification unit, a voltage conversion unit, an extension and retraction unit, and a coil unit, the processor unit is connected to the extension and retraction unit, the filtering and rectification unit is connected to the voltage protection unit and the voltage conversion unit, the voltage protection unit is connected to the coil unit, the extension and retraction unit is secured to the magnetic core unit, the magnetic core unit is disposed in the coil unit, the processor unit is configured to transmit an extension and retraction control signal to the extension and retraction unit, and the extension and retraction unit is configured to control the magnetic core unit to perform extension or retraction in the coil unit based on the extension and retraction control signal to acquire an electromagnetic induction electromotive force; in response to the first electromagnetic induction electromotive force being less than an operating electromagnetic induction electromotive force, controlling the electromagnetic induction energy harvesting device to adaptively control the magnetic core unit to perform extension or retraction in the coil unit based on the first electromagnetic induction electromotive force to obtain a second electromagnetic induction electromotive force; performing filtering and rectification processing and voltage conversion processing on the first electromagnetic induction electromotive force and/or the second electromagnetic induction electromotive force to obtain an electromagnetic induction output voltage; and performing powering processing or charging processing on an electrical device based on the electromagnetic induction output voltage.

The magnetic core unit and the coil unit are both cylindrical in shape. The magnetic core unit includes a first magnetic core subunit, a second magnetic core subunit, a magnetic core securing subunit, and a magnetic core connection subunit. The magnetic core securing subunit is secured to the first magnetic core subunit, the second magnetic core subunit, and the magnetic core connection subunit. The magnetic core connection subunit is disposed between the first magnetic core subunit and the second magnetic core subunit. The coil unit includes a first coil subunit and a second coil subunit. The voltage protection unit is connected to the first coil subunit and the second coil subunit.

The electromagnetic induction energy harvesting device is secured to the power transmission line by a securing unit. Acquiring the first electromagnetic induction electromotive force based on the electromagnetic induction energy harvesting device secured to the power transmission line includes controlling the processor unit in the electromagnetic induction energy harvesting device to transmit the extension and retraction control signal to the extension and retraction unit to make the extension and retraction unit control the magnetic core unit to perform extension or retraction in the first coil subunit based on the extension and retraction control signal to acquire the first electromagnetic induction electromotive force. The expression of the first electromagnetic induction electromotive force is as follows:

$$V_1 = \frac{N_1 \mu_1 S_1}{L_1} \times \omega i_{y1}$$

$V_1$ denotes the first electromagnetic induction electromotive force. $N_1$ denotes the number of coil turns of the first coil subunit. $\mu_1$ denotes the magnetic permeability of the first magnetic core subunit. $S_1$ denotes the equivalent section area of the first coil subunit. $\omega$ denotes an angular velocity. $i_{y1}$ denotes the effective current value of the first coil subunit. $L_1$ denotes the magnetic path length of a first coil magnetic core.

Controlling the electromagnetic induction energy harvesting device to adaptively control the magnetic core unit to perform extension or retraction in the coil unit based on the first electromagnetic induction electromotive force to obtain the second electromagnetic induction electromotive force includes controlling the electromagnetic induction energy harvesting device to adaptively perform voltage compensation processing based on the first electromagnetic induction electromotive force. Controlling the electromagnetic induction energy harvesting device to adaptively perform the voltage compensation processing based on the first electromagnetic induction electromotive force includes controlling the processor unit in the electromagnetic induction energy harvesting device to determine a second coil extension control signal or a second coil retraction control signal based on a coil voltage signal and transmit the second coil extension control signal or the second coil retraction control signal to the extension and retraction unit to make the extension and retraction unit control the magnetic core unit to perform extension or retraction in the second coil subunit based on the second coil extension control signal or the second coil retraction control signal and make adaptive adjustment to obtain the second electromagnetic induction electromotive force. The expression of the second electromagnetic induction electromotive force is as follows:

$$V_2 = \frac{N_2 \mu_2 S_2}{L_2} \times \omega i_{y2}$$

$V_2$ denotes the second electromagnetic induction electromotive force. $N_2$ denotes the number of coil turns of the second coil subunit. $\mu_2$ denotes the magnetic permeability of the second magnetic core subunit. $S_2$ denotes the equivalent section area of the second coil subunit. $\omega$ denotes an angular velocity. $i_{y2}$ denotes the effective current value of the second coil subunit. $L_2$ denotes the magnetic path length of a second coil magnetic core.

Performing the filtering and rectification processing and the voltage conversion processing on the at least one of the first electromagnetic induction electromotive force or the second electromagnetic induction electromotive force to obtain the electromagnetic induction output voltage includes, in response to the first electromagnetic induction electromotive force being greater than or equal to the operating electromagnetic induction electromotive force, performing the filtering and rectification processing and the voltage conversion processing on the first electromagnetic induction electromotive force to obtain the electromagnetic induction output voltage; in response to the first electromagnetic induction electromotive force being less than the operating electromagnetic induction electromotive force and the second electromagnetic induction electromotive force being greater than or equal to the operating electromagnetic induction electromotive force, disconnecting the first coil subunit and performing the filtering and rectification processing and the voltage conversion processing on the second electromagnetic induction electromotive force to obtain the electromagnetic induction output voltage; or in response to the first electromagnetic induction electromotive force and the second electromagnetic induction electromotive force being both less than the operating electromagnetic induction electromotive force, performing the filtering and rectification processing and the voltage conversion processing on a sum of the first electromagnetic induction electromotive force and the second electromagnetic induction electromotive force to obtain the electromagnetic induction output voltage.

Performing the powering processing or the charging processing on the electrical device based on the electromagnetic induction output voltage includes comparing the electromagnetic induction output voltage with a threshold voltage, and performing the powering processing or the charging processing based on the voltage comparison result. Performing the powering processing or the charging processing based on the voltage comparison result includes, in response to the electromagnetic induction output voltage being less than the threshold voltage, performing charging an electrical energy storage unit and/or supplying power to the electrical device by using an electrical energy storage unit; or in response to the electromagnetic induction output voltage being greater than or equal to the threshold voltage, performing the powering processing on the electrical device.

An adaptive control electromagnetic induction energy harvesting system for a power transmission line includes an electromagnetic induction energy harvesting device and an analysis and control unit. The electromagnetic induction energy harvesting device includes a magnetic core unit, a processor unit, a voltage protection unit, a filtering and rectification unit, a voltage conversion unit, an extension and retraction unit, and a coil unit. The processor unit is connected to the extension and retraction unit. The filtering and rectification unit is connected to the voltage protection unit and the voltage conversion unit. The voltage protection unit is connected to the coil unit. The extension and retraction unit is secured to the magnetic core unit. The magnetic core unit is disposed in the coil unit. The processor unit is configured to transmit an extension and retraction control signal to the extension and retraction unit. The extension and retraction unit is configured to control the magnetic core unit to perform extension or retraction in the coil unit based on the extension and retraction control signal to acquire an electromagnetic induction electromotive force. The analysis and control unit is configured to acquire a first electromagnetic induction electromotive force based on the electromagnetic induction energy harvesting device secured to the power transmission line; in response to the first electromagnetic induction electromotive force being less than an operating electromagnetic induction electromotive force, control the electromagnetic induction energy harvesting device to adaptively control the magnetic core unit to perform extension or retraction in the coil unit based on the first electromagnetic induction electromotive force to obtain a second electromagnetic induction electromotive force; perform filtering and rectification processing and voltage conversion processing on the first electromagnetic induction electromotive force and/or the second electromagnetic induction electromotive force to obtain an electromagnetic induction output voltage; and perform powering processing or charging processing on an electrical device based on the electromagnetic induction output voltage.

The magnetic core unit and the coil unit are both cylindrical in shape. The magnetic core unit includes a first magnetic core subunit, a second magnetic core subunit, a magnetic core securing subunit, and a magnetic core connection subunit. The magnetic core securing subunit is secured to the first magnetic core subunit, the second magnetic core subunit, and the magnetic core connection subunit. The magnetic core connection subunit is disposed between the first magnetic core subunit and the second magnetic core subunit. The coil unit includes a first coil subunit and a second coil subunit. The voltage protection unit is connected to the first coil subunit and the second coil subunit.

The voltage conversion unit includes a MAX5035 chip, a first capacitor C1, a second capacitor C2, a third capacitor C3, a fourth capacitor C4, a transistor D1, a first variable resistor R1, a second variable resistor R2, and an inductor L1. Pin 1 of the MAX5035 chip is connected to one terminal of the first capacitor C1. The other terminal of the first capacitor C1 is connected to one terminal of the inductor L1, pin 8 of the MAX5035 chip, and the cathode of the transistor D1 separately. The anode of the transistor D1 is grounded. The other terminal of the inductor L1 is connected to one terminal of the third capacitor C3. The other terminal of the third capacitor C3 is grounded. Pin 2 of the MAX5035 chip is connected to one terminal of the second capacitor C2. The other terminal of the second capacitor C2 is connected to pin 3 of the MAX5035 chip. Pin 7 of the MAX5035 chip is connected to one terminal of the second variable resistor R2, one terminal of the fourth capacitor C4, and the electrical device separately. Pin 5 of the MAX5035 chip is connected to the other terminal of the second variable resistor R2 and one terminal of the first variable resistor R1. Pin 6 of the MAX5035 chip, the other terminal of the first variable resistor R1, and the other terminal of the fourth capacitor C4 are grounded.

The electromagnetic induction energy harvesting device is secured to the power transmission line by a securing unit. The analysis and control unit is configured to acquire the first electromagnetic induction electromotive force based on the electromagnetic induction energy harvesting device secured to the power transmission line by controlling the processor unit in the electromagnetic induction energy harvesting device to transmit the extension and retraction control signal to the extension and retraction unit to make the extension and retraction unit control the magnetic core unit to perform extension or retraction in the first coil subunit based on the extension and retraction control signal to acquire the first electromagnetic induction electromotive force. The expression of the first electromagnetic induction electromotive force is as follows:

$$V_1 = \frac{N_1 \mu_1 S_1}{L_1} \times \omega i_{y1}$$

$V_1$ denotes the first electromagnetic induction electromotive force. $N_1$ denotes the number of coil turns of the first coil subunit. $\mu_1$ denotes the magnetic permeability of the first magnetic core subunit. $S_1$ denotes the equivalent section area of the first coil subunit. $\omega$ denotes an angular velocity. $i_{y1}$ denotes the effective current value of the first coil subunit. $L_1$ denotes the magnetic path length of a first coil magnetic core.

The analysis and control unit is configured to control the electromagnetic induction energy harvesting device to adaptively control the magnetic core unit to perform extension or retraction in the coil unit based on the first electromagnetic induction electromotive force to obtain the second electromagnetic induction electromotive force by controlling the electromagnetic induction energy harvesting device to adaptively perform voltage compensation processing based on the first electromagnetic induction electromotive force. The analysis and control unit is configured to control the electromagnetic induction energy harvesting device to adaptively perform the voltage compensation processing based on the first electromagnetic induction electromotive force by controlling the processor unit in the electromagnetic induction energy harvesting device to determine a second coil extension control signal or a second coil retraction control signal based on a coil voltage signal and transmit the second coil extension control signal or the second coil retraction control signal to the extension and retraction unit to make the extension and retraction unit control the magnetic core unit to perform extension or retraction in the second coil subunit based on the second coil extension control signal or the second coil retraction control signal and make adaptive adjustment to obtain the second electromagnetic induction electromotive force. The expression of the second electromagnetic induction electromotive force is as follows:

$$V_2 = \frac{N_2 \mu_2 S_2}{L_2} \times \omega i_{y2}$$

$V_2$ denotes the second electromagnetic induction electromotive force. $N_2$ denotes the number of coil turns of the second coil subunit. $\mu_2$ denotes the magnetic permeability of the second magnetic core subunit. $S_2$ denotes the equivalent section area of the second coil subunit. $\omega$ denotes an angular velocity. $i_{y2}$ denotes the effective current value of the second coil subunit. $L_2$ denotes the magnetic path length of a second coil magnetic core.

The analysis and control unit is configured to perform the filtering and rectification processing and the voltage conversion processing on the first electromagnetic induction electromotive force and/or the second electromagnetic induction electromotive force to obtain the electromagnetic induction output voltage by, in response to the first electromagnetic induction electromotive force being greater than or equal to the operating electromagnetic induction electromotive force, performing the filtering and rectification processing and the voltage conversion processing on the first electromagnetic induction electromotive force to obtain the electromagnetic induction output voltage; in response to the first electromagnetic induction electromotive force being less than the operating electromagnetic induction electromotive force and the second electromagnetic induction electromotive force being greater than or equal to the operating electromagnetic induction electromotive force, disconnecting the first coil subunit and performing the filtering and rectification processing and the voltage conversion processing on the second electromagnetic induction electromotive force to obtain the electromagnetic induction output voltage; or in response to the first electromagnetic induction electromotive force and the second electromagnetic induction electromotive force being both less than the operating electromagnetic induction electromotive force, performing the filtering and rectification processing and the voltage conversion processing on a sum of the first electromagnetic induction electromotive force and the second electromagnetic induction electromotive force to obtain the electromagnetic induction output voltage.

The analysis and control unit is configured to perform the powering processing or the charging processing on the electrical device based on the electromagnetic induction output voltage by comparing the electromagnetic induction output voltage with a threshold voltage. The expression of the value of the threshold voltage is as follows:

$$V_m = \left(1 + \frac{R_2}{R_1}\right) \times V_{out}$$

where $V_m$ denotes the threshold voltage, $R_1$ denotes the resistance value of the first variable resistor R1 in the voltage conversion unit, $R_2$ denotes the resistance value of the second variable resistor R2 in the voltage conversion unit, and $V_{out}$ denotes a preset output voltage value; and performing the powering processing or the charging processing based on a voltage comparison result. Performing the powering processing or the charging processing based on the voltage comparison result includes, in response to the electromagnetic induction output voltage being less than the threshold voltage, performing charging an electrical energy storage unit and/or supplying power to the electrical device by using an electrical energy storage unit; or in response to the electromagnetic induction output voltage being greater than or equal to the threshold voltage, performing the powering processing on the electrical device.

Figure 1:
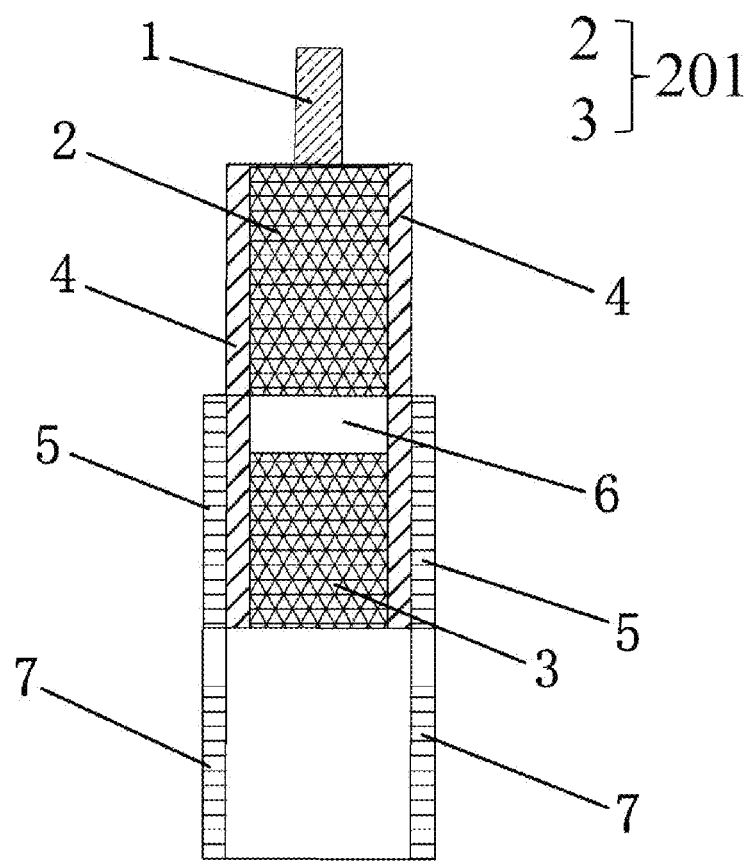
FIG. 1 is a diagram illustrating the structure of an electromagnetic induction energy harvesting device according to an embodiment of the present application.

Reference signs in the drawings: 1. extension and retraction unit, 2. second magnetic core subunit, 3. first magnetic core subunit, 4. magnetic core securing subunit, 5. first coil subunit, 6. magnetic core connection subunit, 7. second coil subunit, 101. power transmission line, 102. securing unit, 201. magnetic core unit, 301. voltage protection unit, 401. filtering and rectification unit, 501. coil unit, 601. voltage conversion unit, 701. processor unit, 10. electromagnetic induction energy harvesting device, 20. analysis and control unit

DETAILED DESCRIPTION

The present application is described hereinafter in detail in conjunction with drawings and embodiments. The embodiments are implemented on the basis of the solution of the present application. Detailed embodiments and specific operation processes are given, but the scope of the present application is not limited to the embodiments hereinafter.

Unless otherwise defined, all technical and scientific terms used herein have meanings the same as those commonly understood by those skilled in the art to which the present disclosure pertains. The terms used in the specification of the present disclosure are only used for describing specific embodiments and are not intended to limit the present disclosure.

Implementations described in example embodiments below do not represent all implementations consistent with the present disclosure. Conversely, these implementations are merely examples of the apparatus and method that are consistent with some aspects of the present disclosure as detailed in the appended claims.

Embodiment One

As shown in FIGS. 1 and 2 and FIGS. 5 and 6, this embodiment provides an electromagnetic induction energy harvesting device 10. The electromagnetic induction energy harvesting device 10 includes a magnetic core unit 201, a processor unit 701, a voltage protection unit 301, a filtering and rectification unit 401, a voltage conversion unit 601, an extension and retraction unit 1, and a coil unit 501.

In an embodiment, the magnetic core unit 201 is secured to the extension and retraction unit 1, and the magnetic core unit 201 includes a first magnetic core subunit 3, a second magnetic core subunit 2, a magnetic core securing subunit 4, and a magnetic core connection subunit 6. The magnetic core securing subunit 4 is secured to the first magnetic core subunit 3, the second magnetic core subunit 2, and the magnetic core connection subunit 6. The magnetic core connection subunit 6 is disposed between the first magnetic core subunit 3 and the second magnetic core subunit 2. The magnetic core connection subunit 6 may be made of a non-magnetic material or may be an air gap. The magnetic permeability of the first magnetic core subunit 3 may be greater than, equal to, or less than the magnetic permeability of the second magnetic core subunit 2, depending on the actual situation. Other embodiments derived from increasing or decreasing the number of magnetic core subunits and the number of coil subunits are within the protection scope of the present application.

In this embodiment, the magnetic core unit 201 and the coil unit 501 are both cylindrical in shape. Since the magnetic core unit 201 is cylindrical in shape, compared with a traditional magnetic core with the structure in a rectangle shape with a horizontal line in the middle, it is more convenient to secure the electromagnetic induction energy harvesting device 10 to the power transmission line 101 by using a minimalistic securing structure. In contrast, a traditional electromagnetic induction energy harvesting device provided with a magnetic core having the structure in a rectangle shape with a horizontal line in the middle or another closed-loop structure requires the power transmission line to pass through this structure and requires this structure to be secured to the power transmission line, resulting in an excessively complex securing structure. In other embodiments, the magnetic core unit 201 and the coil unit 501 may also be in other shapes. Other embodiments derived from changing the shapes are within the protection scope of the present application.

The coil unit 501 includes a first coil subunit 5 and a second coil subunit 7. The voltage protection unit 301 is connected to the first coil subunit 5 and the second coil subunit 7. The first coil subunit 5 is configured to acquire a first electromagnetic induction electromotive force. The second coil subunit 7 is configured to acquire a second electromagnetic induction electromotive force (for voltage compensation). The number of coil turns of the first coil subunit 5 may be greater than, equal to, or less than the number of coil turns of the second coil subunit 7, depending on the actual situation. Other embodiments derived from increasing or reducing the number of coil subunits or the number of coil turns of each subunit are within the protection scope of the present application.

The extension and retraction unit 1 is configured to control the magnetic core unit 201 to perform extension or retraction in the coil unit 501 based on an extension and retraction control signal. The extension and retraction control signal includes an extension control signal and a retraction control signal. The extension control signal includes a first coil extension control signal (for controlling the extension of the first coil subunit 5) and a second coil extension control signal (for controlling the extension of the second coil subunit 7). The retraction control signal includes a first coil retraction control signal (for controlling the retraction of the first coil subunit 5) and a second coil retraction control signal (for controlling the retraction of the second coil subunit 7).

Figure 2:
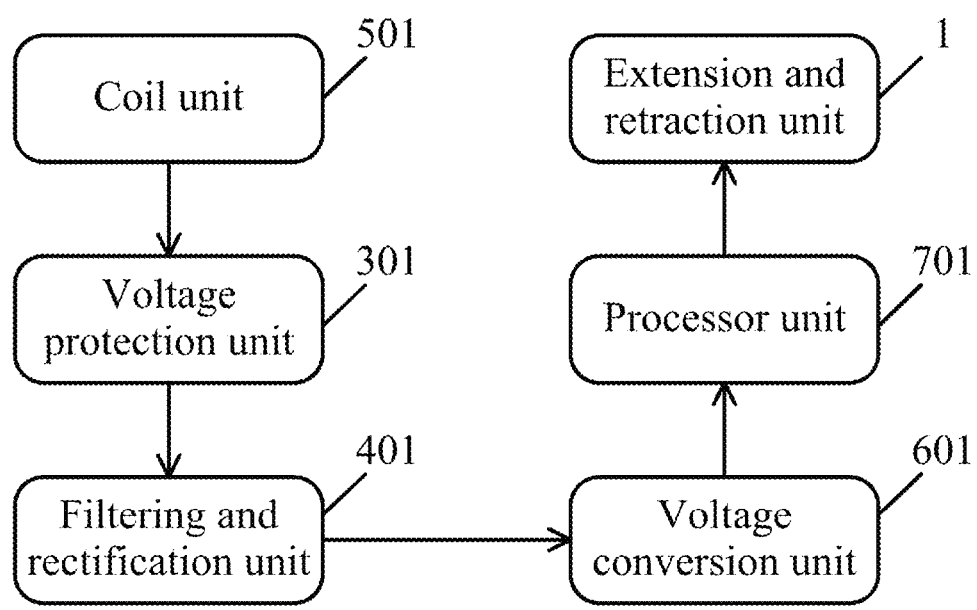
FIG. 2 is a diagram illustrating the electrical connection between multiple units of an electromagnetic induction energy harvesting device according to an embodiment of the present application.

The electrical connection between multiple units is shown in FIG. 2. The processor unit 701 is connected to the extension and retraction unit 1. The filtering and rectification unit 401 is connected to the voltage protection unit 301 and the voltage conversion unit 601. The voltage protection unit 301 is connected to the coil unit 501. The extension and retraction unit 1 is secured to the magnetic core unit 201. The magnetic core unit 201 is disposed in the coil unit 501. The processor unit 701 is configured to transmit the extension and retraction control signal to the extension and retraction unit 1. The extension and retraction unit 1 is configured to control the magnetic core unit 201 to perform extension or retraction in the coil unit 501 based on the extension and retraction control signal to acquire an electromagnetic induction electromotive force.

In an embodiment, the electromagnetic induction energy harvesting device 10 also includes an electrical energy storage unit.

Figure 3:
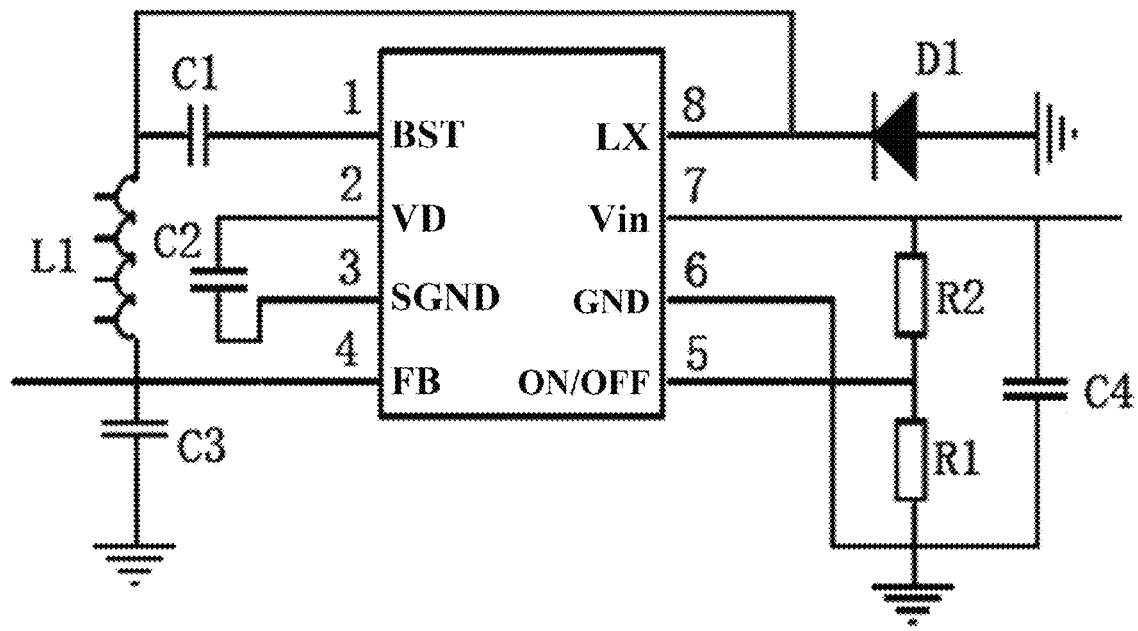
FIG. 3 is a circuit diagram of a voltage conversion unit according to an embodiment of the present application.

In an embodiment, as shown in FIG. 3, the voltage conversion unit 601 includes a MAX5035 chip, a first capacitor C1, a second capacitor C2, a third capacitor C3, a fourth capacitor C4, a transistor D1, a first variable resistor R1, a second variable resistor R2, and an inductor L1. Pin 1 of the MAX5035 chip is connected to one terminal of the first capacitor C1. The other terminal of the first capacitor C1 is connected to one terminal of the inductor L1, pin 8 of the MAX5035 chip, and the cathode of the transistor D1 separately. The anode of the transistor D1 is grounded. The other terminal of the inductor L1 is connected to one terminal of the third capacitor C3. The other terminal of the third capacitor C3 is grounded. Pin 2 of the MAX5035 chip is connected to one terminal of the second capacitor C2. The other terminal of the second capacitor C2 is connected to pin 3 of the MAX5035 chip. Pin 7 of the MAX5035 chip is connected to one terminal of the second variable resistor R2, one terminal of the fourth capacitor C4, and the electrical device separately. Pin 5 of the MAX5035 chip is connected to the other terminal of the second variable resistor R2 and one terminal of the first variable resistor R1. Pin 6 of the MAX5035 chip, the other terminal of the first variable resistor R1, and the other terminal of the fourth capacitor C4 are grounded.

Embodiment Two

Figure 4:
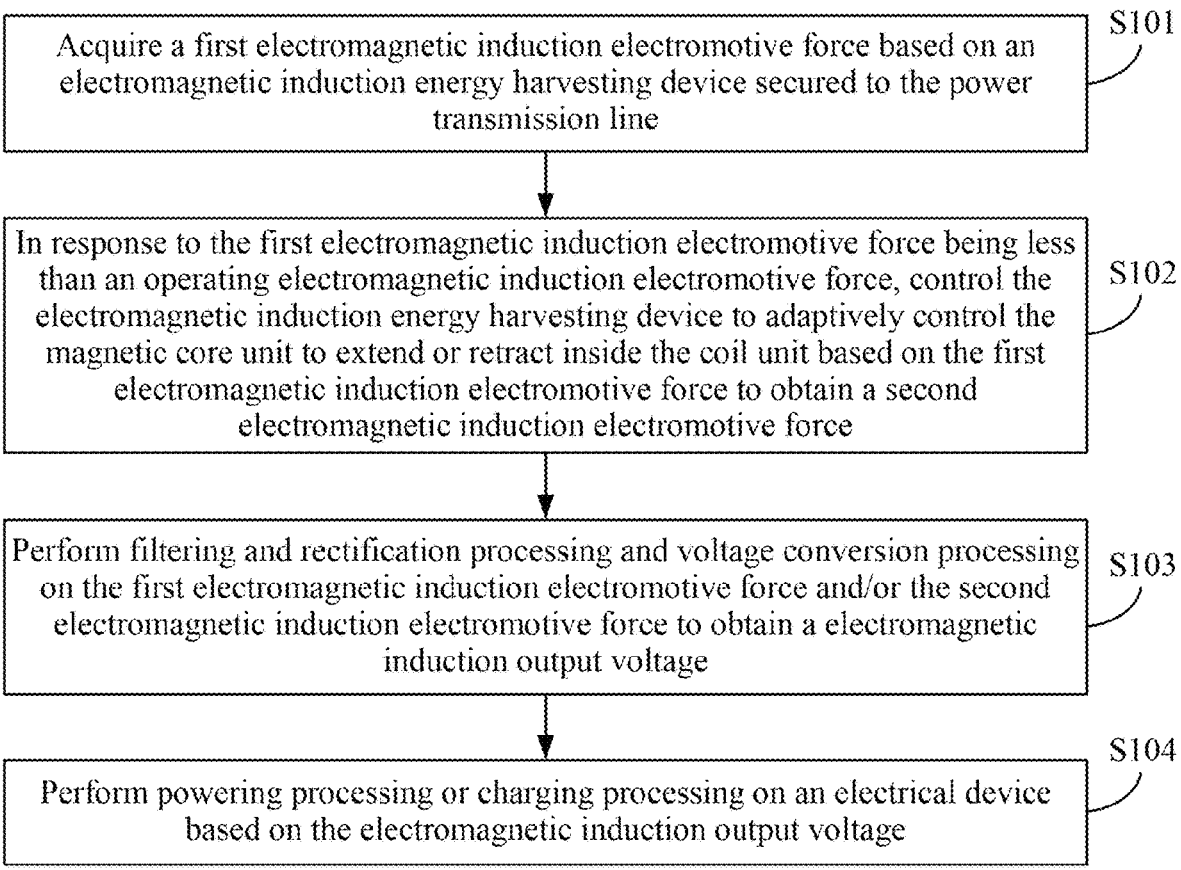
FIG. 4 is a flowchart of an adaptive control electromagnetic induction energy harvesting method for a power transmission line according to an embodiment of the present application.

This embodiment provides an adaptive control electromagnetic induction energy harvesting method for a power transmission line. As shown in FIG. 4, the method includes the following steps:

In S101, a first electromagnetic induction electromotive force is acquired based on an electromagnetic induction energy harvesting device secured to the power transmission line.

Figure 5:
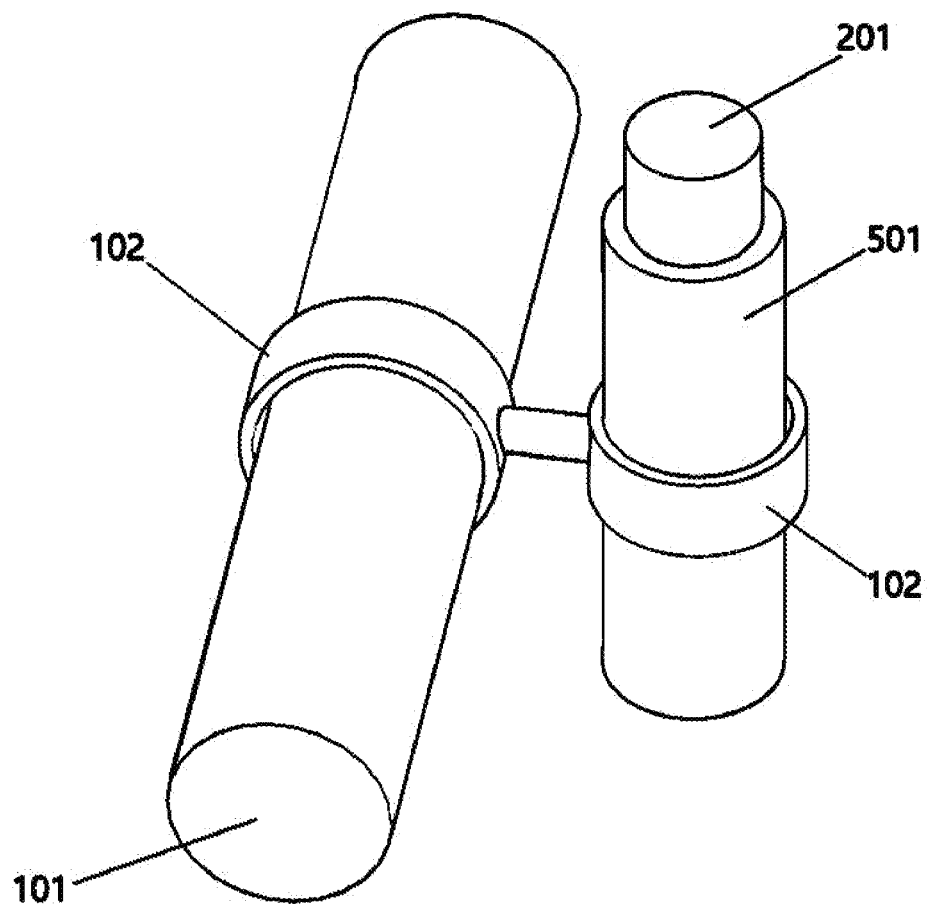
FIG. 5 is a connection diagram illustrating that an electromagnetic induction energy harvesting device is secured to a power transmission line according to an embodiment of the present application.
Figure 6:
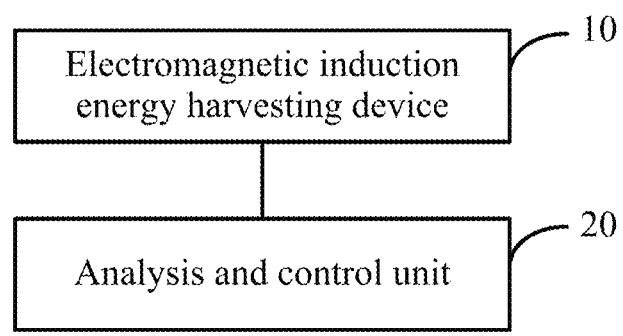
FIG. 6 is a diagram illustrating the structure of an adaptive control electromagnetic induction energy harvesting system for a power transmission line according to an embodiment of the present application.

S101 includes the following steps:

(1) As shown in FIG. 5, the electromagnetic induction energy harvesting device 10 is secured to the power transmission line 101 by a securing unit 102. The structure of the electromagnetic induction energy harvesting device 10 is as described in Embodiment one. The details are not described here again.

(2) The processor unit 701 in the electromagnetic induction energy harvesting device 10 is controlled to transmit an extension and retraction control signal to the extension and retraction unit 1 to make the extension and retraction unit 1 control the magnetic core unit 201 to perform extension or retraction in the first coil subunit 5 based on the extension and retraction control signal to acquire the first electromagnetic induction electromotive force.

The extension and retraction control signal includes an extension control signal and a retraction control signal. The extension control signal includes a first coil extension control signal (for controlling the extension of the first coil subunit 5) and a second coil extension control signal (for controlling the extension of the second coil subunit 7). The retraction control signal includes a first coil retraction control signal (for controlling the retraction of the first coil subunit 5) and a second coil retraction control signal (for controlling the retraction of the second coil subunit 7). The electromagnetic induction energy harvesting device 10 is secured to the power transmission line 101 by the securing unit 102, and the first electromagnetic induction electromotive force is acquired based on the electromagnetic induction energy harvesting device 10, that is, the first magnetic core subunit 3 is controlled to perform extension or retraction in the first coil subunit 5 based on the first coil extension control signal or the first coil retraction control signal to obtain the first electromagnetic induction electromotive force.

The first coil extension control signal includes a primary extension control signal, a secondary extension control signal, and a tertiary extension control signal. The processor unit 701 transmits the primary extension control signal, the secondary extension control signal, or the tertiary extension control signal to the extension and retraction unit 1. The extension and retraction unit 1 receives the primary extension control signal, the secondary extension control signal, or the tertiary extension control signal which is transmitted by the processor unit 701. The extension and retraction unit 1 controls the degree of extension of the magnetic core unit 201 in the coil unit 501 based on the primary extension control signal, the secondary extension control signal, or the tertiary extension control signal. In other words, the extension and retraction unit 1 controls the degree of extension of the first magnetic core subunit 3 in the first coil subunit 5 based on the primary extension control signal, the secondary extension control signal, or the tertiary extension control signal. The settings of the second coil extension control signal are similar to those of the first coil extension control signal. The details are not described here.

The retraction control signal includes a primary retraction control signal, a secondary retraction control signal, and a tertiary retraction control signal. The processor unit 701 transmits the primary retraction control signal, the secondary retraction control signal, or the tertiary retraction control signal to the extension and retraction unit 1. The extension and retraction unit 1 receives the primary retraction control signal, the secondary retraction control signal, or the tertiary retraction control signal which is transmitted by the processor unit 701. The extension and retraction unit 1 controls the degree of retraction of the magnetic core unit 201 in the coil unit 501 based on the primary retraction control signal, the secondary retraction control signal, or the tertiary retraction control signal. In other words, the extension and retraction unit 1 controls the degree of retraction of the first magnetic core subunit 3 in the first coil subunit 5 based on the primary retraction control signal, the secondary retraction control signal, or the tertiary retraction control signal. The settings of the second coil retraction control signal are similar to those of the first coil retraction control signal. The details are not described here. The number of extension control signals and the number of retraction control signals may be set according to the actual usage. An increased or decreased number of extension control signals and an increased or decreased number of retraction control signals fall within the scope of protection of the present application.

The expression of the first electromagnetic induction electromotive force is as follows:

$$V_1 = \frac{N_1 \mu_1 S_1}{L_1} \times \omega i_{y1}$$

$V_1$ denotes the first electromagnetic induction electromotive force. $N_1$ denotes the number of coil turns of the first coil subunit 5. $\mu_1$ denotes the magnetic permeability of the first magnetic core subunit 3. $S_1$ denotes the equivalent section area of the first coil subunit 5. $\omega$ denotes an angular velocity. $i_{y1}$ denotes the effective current value of the first coil subunit 5. $L_1$ denotes the magnetic path length of a first coil magnetic core.

In S102, if the first electromagnetic induction electromotive force is less than an operating electromagnetic induction electromotive force, the electromagnetic induction energy harvesting device is controlled to adaptively control the magnetic core unit to perform extension or retraction in the coil unit based on the first electromagnetic induction electromotive force to obtain a second electromagnetic induction electromotive force.

The electromagnetic induction energy harvesting device 10 is controlled and adjusted based on the first electromagnetic induction electromotive force. The second electromagnetic induction electromotive force is obtained based on the second coil subunit 7, thereby obtaining the total electromagnetic induction electromotive force. When the total electromagnetic induction electromotive force is greater than or equal to the operating electromagnetic induction electromotive force, the operating electromagnetic induction electromotive force is the minimum electromotive force that satisfies the power required for the electrical device.

If the first electromagnetic induction electromotive force is less than the operating electromagnetic induction electromotive force, the electromagnetic induction energy harvesting device 10 is controlled to perform voltage compensation processing based on the first electromagnetic induction electromotive force. The processor unit 701 determines a second coil extension control signal or a second coil retraction control signal based on a coil voltage signal and transmits the second coil extension control signal or the second coil retraction control signal to the extension and retraction unit 1. The extension and retraction unit 1 controls the magnetic core unit 201 to perform extension or retraction in the second coil subunit 7 based on the second coil extension control signal or the second coil retraction control signal, adaptively obtaining the second electromagnetic induction electromotive force.

The processor unit 701 acquires the voltage signal output from the coil unit 501 and generates an extension control signal or a retraction control signal based on the coil voltage signal and transmits the extension control signal or the retraction control signal to the extension and retraction unit 1. The key concept of the present application is "adaptive", meaning the extension or retraction of the magnetic core is adaptive. For example, if the processor unit 701 controls the magnetic core unit 201 to perform extension or retraction in the coil unit 501, the current in the wire may change, potentially causing an excessively large or small total electromagnetic induction electromotive force. If the electromagnetic induction electromotive force exceeds the set maximum electromotive force, the extension and retraction unit 1 controls the magnetic core unit 201 to perform the retraction in the coil unit 501 based on the retraction control signal. If the retraction of the magnetic core unit 201 in the coil unit 501 results in a further decrease in the electromagnetic induction electromotive force, failing to reach the operating voltage, the magnetic core unit 201 is controlled to continue extending into the coil unit 501. Through a series of adaptive extension and retraction adjustments, the electromagnetic induction electromotive force is regulated until the total electromagnetic induction electromotive force is greater than or equal to the operating electromagnetic induction electromotive force. In other words, the extension or retraction control is adaptive, allowing the magnetic core unit 201 to adjust its degree of extension or retraction in the coil unit 501 based on the magnitude of the electromagnetic induction electromotive force, thereby outputting an appropriate voltage.

For example, when the extension and retraction unit 1 controls the degree of extension of the magnetic core unit 201 in the coil unit 501 based on the primary extension control signal, and the obtained primary electromagnetic induction electromotive force is smaller than the operating electromagnetic induction electromotive force, the processor unit 701 transmits the secondary extension control signal to the extension and retraction unit 1. The extension and retraction unit 1 receives the secondary extension control signal transmitted by the processor unit 701. The extension and retraction unit 1 controls the magnetic core unit 201 to continue performing the extension in the coil unit 501 based on the secondary extension control signal to obtain a secondary electromagnetic induction electromotive force. If the secondary electromagnetic induction electromotive force is still smaller than the operating electromagnetic induction electromotive force, the processor unit 701 transmits the tertiary extension control signal to the extension and retraction unit 1. The extension and retraction unit 1 receives the tertiary extension control signal transmitted by the processor unit 701. The extension and retraction unit 1 controls the magnetic core unit 201 to continue performing the extension in the coil unit 501 based on the tertiary extension control signal to obtain a tertiary electromagnetic induction electromotive force. If the tertiary electromagnetic induction electromotive force is still smaller than the operating electromagnetic induction electromotive force, the processor unit 701 transmits the second coil extension control signal to the extension and retraction unit 1. The extension and retraction unit 1 receives the second coil extension control signal transmitted by the processor unit 701. The extension and retraction unit 1 controls the magnetic core unit 201 to continue performing the extension in the coil unit 501 based on the multi-level second coil extension control signals until the obtained electromagnetic induction electromotive force is greater than or equal to the operating electromagnetic induction electromotive force.

The expression of the second electromagnetic induction electromotive force is as follows:

$$V_2 = \frac{N_2 \mu_2 S_2}{L_2} \times \omega i_{y2}$$

$V_2$ denotes the second electromagnetic induction electromotive force. $N_2$ denotes the number of coil turns of the second coil subunit 7. $\mu_2$ denotes the magnetic permeability of the second magnetic core subunit 2. $S_2$ denotes the equivalent section area of the second coil subunit 7. $\omega$ denotes an angular velocity. $i_{y2}$ denotes the effective current value of the second coil subunit 7. $L_2$ denotes the magnetic path length of a second coil magnetic core.

In S103, filtering and rectification processing and voltage conversion processing are performed on at least one of the first electromagnetic induction electromotive force or the second electromagnetic induction electromotive force to obtain a stable operating electromagnetic induction output voltage.

The following three cases are involved:

1. The electromagnetic induction output voltage is determined based on the first electromagnetic induction electromotive force: When the first electromagnetic induction electromotive force is greater than or equal to the operating electromagnetic induction electromotive force, no voltage compensation is required, and therefore, no second electromagnetic induction electromotive force is generated. In this case, filtering and rectification processing and voltage conversion processing are performed on the first electromagnetic induction electromotive force to obtain the electromagnetic induction output voltage.

2. The electromagnetic induction output voltage is determined based on the second electromagnetic induction electromotive force: When the first electromagnetic induction electromotive force is less than the operating electromagnetic induction electromotive force, voltage compensation processing in step S102 is required. If the generated second electromagnetic induction electromotive force is greater than or equal to the operating electromagnetic induction electromotive force, it indicates that the system can operate solely using the second electromagnetic induction electromotive force. The first coil subunit is disconnected, causing the first electromagnetic induction electromotive force to be zero. Then, filtering and rectification processing and voltage conversion processing are performed on the second electromagnetic induction electromotive force to obtain the electromagnetic induction output voltage.

3. The electromagnetic induction output voltage is determined based on the first electromagnetic induction electromotive force and the second electromagnetic induction electromotive force: When the first electromagnetic induction electromotive force is less than the operating electromagnetic induction electromotive force, voltage compensation processing in step S102 is required. During this process, the second electromagnetic induction electromotive force is generated. If the second electromagnetic induction electromotive force is less than the operating electromagnetic induction electromotive force, the second electromagnetic induction electromotive force cannot be used alone for operation. Therefore, the second electromagnetic induction electromotive force is used to compensate for the first electromagnetic induction electromotive force (that is, they are summed up) to obtain the total electromagnetic induction electromotive force. Filtering and rectification processing and voltage conversion processing are performed on the total electromagnetic induction electromotive force. In this case, in step S102, the magnetic core unit is adaptively controlled to perform extension and retraction in the second coil subunit until the total electromagnetic induction electromotive force is greater than or equal to the operating electromagnetic induction electromotive force.

In S104, powering processing or charging processing is performed on an electrical device based on the electromagnetic induction output voltage.

S104 includes the following steps:

(1) The electromagnetic induction output voltage is compared with a threshold voltage.

In an embodiment, the expression of the value of the threshold voltage is as follows:

$$V_m = \left(1 + \frac{R_2}{R_1}\right) \times V_{out}$$

$V_m$ denotes the threshold voltage. $R_1$ denotes the resistance value of the first variable resistor R1 in the voltage conversion unit 601. $R_2$ denotes the resistance value of the second variable resistor R2 in the voltage conversion unit 601. $V_{out}$ denotes a preset output voltage value.

(2) The powering processing or the charging processing is performed based on the voltage comparison result: in response to the electromagnetic induction output voltage being less than the threshold voltage, charging the electrical energy storage unit and/or supplying power to the electrical device by using the electrical energy storage unit is performed; or in response to the electromagnetic induction output voltage being greater than or equal to the threshold voltage, the powering processing is performed on the electrical device.

According to the present application, the threshold value is determined based on the first variable resistor R1 and the second variable resistor R2 in the voltage conversion unit 601 and compared with the electromagnetic induction output voltage, and powering or charging is selected based on the voltage comparison result. This allows the threshold value to be determined according to different scenarios, that is, the threshold value is not a fixed preset value, better enhancing the stability of the output voltage of the electromagnetic induction energy harvesting device 10. A traditional voltage conversion module performs simple voltage conversion without setting a threshold value. In the present application, the first variable resistor R1 and second variable resistor R2 allow for setting and adjustment of the threshold value according to the actual usage, enhancing the stability of the output voltage of the electromagnetic induction energy harvesting device 10.

Embodiment Three

As shown in FIGS. 1 to 6, this embodiment provides an adaptive control electromagnetic induction energy harvesting system for a power transmission line. The system includes an electromagnetic induction energy harvesting device 10 and an analysis and control unit 20.

The electromagnetic induction energy harvesting device 10 includes a magnetic core unit 201, a processor unit 701, a voltage protection unit 301, a filtering and rectification unit 401, a voltage conversion unit 601, an extension and retraction unit 1, and a coil unit 501. The processor unit 701 is connected to the extension and retraction unit 1. The filtering and rectification unit 401 is connected to the voltage protection unit 301 and the voltage conversion unit 601. The voltage protection unit 301 is connected to the coil unit 501. The extension and retraction unit 1 is secured to the magnetic core unit 201. The magnetic core unit 201 is disposed in the coil unit 501. The processor unit 701 is configured to transmit an extension and retraction control signal to the extension and retraction unit 1. The extension and retraction unit 1 is configured to control the magnetic core unit 201 to perform extension or retraction in the coil unit 501 based on the extension and retraction control signal to acquire an electromagnetic induction electromotive force. The analysis and control unit 20 is configured to acquire a first electromagnetic induction electromotive force based on the electromagnetic induction energy harvesting device 10 secured to the power transmission line 101; in response to the first electromagnetic induction electromotive force being less than an operating electromagnetic induction electromotive force, control the electromagnetic induction energy harvesting device 10 to adaptively control the magnetic core unit 201 to perform the extension or retraction in the coil unit 501 based on the first electromagnetic induction electromotive force to obtain a second electromagnetic induction electromotive force; perform filtering and rectification processing and voltage conversion processing on the first electromagnetic induction electromotive force and/or the second electromagnetic induction electromotive force to obtain an electromagnetic induction output voltage; and perform powering processing or charging processing on an electrical device based on the electromagnetic induction output voltage.

Those skilled in the art can clearly understand that, for the sake of convenience and simplicity of description, for details about the structure of the electromagnetic induction energy harvesting device 10, see Embodiment one; and for details about the working process of the analysis and control unit 20, see the corresponding process in Embodiment two. These details are not described here again.

Compared with the related art, the present application can achieve the following effects:

1. According to the present application, by securing the electromagnetic induction energy harvesting device to the power transmission line, the magnetic core unit is adaptively controlled to perform the extension or retraction in the coil unit to acquire the electromagnetic induction electromotive force, and the powering processing or charging processing is selected to be performed on the electrical device.

2. According to the present application, the threshold value is determined based on the first variable resistor R1 and the second variable resistor R2 in the voltage conversion unit and compared with the electromagnetic induction output voltage, and powering or charging is selected based on the voltage comparison result. This allows the threshold value to be determined according to different scenarios, that is, the threshold value is not a fixed preset value, better enhancing the stability of the output voltage of the electromagnetic induction energy harvesting device.

3. According to the present application, the magnetic core unit and the coil unit are both cylindrical in shape. Compared with a traditional magnetic core with the structure in a rectangle shape with a horizontal line in the middle, it is more convenient to secure the electromagnetic induction energy harvesting device 10 to the power transmission line 101 by using a minimalistic securing structure, making maintenance and installation more convenient.

4. According to the present application, multiple extension control signals and multiple retraction control signals are used to control the degree of the extension and retraction of the magnetic core unit in the coil unit, improving the stability of the output voltage of the electromagnetic induction energy harvesting device.

Terms such as "first", "second", and "third" in the description and the above drawings of the present application are used for distinguishing between similar objects and not necessarily used for describing a particular order or sequence. It should be understood that data used in this way is interchangeable when appropriate so that the embodiments of the present application described herein can be implemented in a sequence not illustrated or described herein, for example. Additionally, terms "include" and "have" and any variations thereof are intended to encompass a non-exclusive inclusion. For example, a process, method, system, product or device that includes a series of steps or units not only includes the expressly listed steps or units but may also include other steps or units that are not expressly listed or are inherent to such process, method, product or device. In the absence of more restrictions, a process, method, article, or device that includes an element may also include another element that is the same as or equivalent to the preceding element. For example, the words such as "first" and "second" are used for indicating names and do not indicate any particular order.

When one component is considered to be "connected" to another component, it may be directly connected to the other component or may be connected to the other component by an intermediate component. In addition, the term "connection" in the following embodiments should be understood as "electrical connection" or "communicative connection" if there is a transmission of electrical signals or data between the connected objects.

It should be understood that in the present application, "at least one" refers to one or more and "multiple" refers to two or more. "And/or" is used for describing an association between associated objects and indicates three relations, for example, "A and/or B" may indicate the presence of A alone, the presence of B alone and the presence of both A and B, where A and B may be singular or plural. The character "/" generally indicates an "or" relation between associated objects. "At least one of the following" or a similar expression thereof refers to any combination of items, including any combination of singular items or plural items. For example, at least one of a, b or c may indicate a, b, c, "a and b", "a and c", "b and c" or "a and b and c", where a, b and c may be singular or plural.

It is to be understood that the systems, apparatuses and methods disclosed in the embodiments of the present application may be implemented in other manners. For example, the apparatus embodiment described above is merely illustrative. For example, a unit division is merely a logical function division, and, in practice, the unit division may be implemented in other ways. For example, multiple units or components may be combined or may be integrated into another system, or some features may be ignored or not executed. Additionally, the presented or discussed mutual coupling, direct coupling, or communication connections may be indirect coupling or communication connections via interfaces, apparatuses, or units, or may be electrical, mechanical, or in other forms.

The units described as separate components may or may not be physically separated. Components presented as units may or may not be physical units, that is, may be located in one place or may be distributed on multiple network units. Part or all of these units may be selected according to actual requirements to achieve the objects of the solutions in the embodiments.

Additionally, various function units in each embodiment herein may be integrated into one processing unit, or each unit may be physically presented separately, or two or more units may be integrated into one unit. The integrated unit may be implemented by hardware or implemented in the form of a software function unit.

The integrated unit may be stored in a computer-readable storage medium if implemented in the form of the software functional unit and sold or used as an independent product. Based on this understanding, the technical solutions according to the present application may be embodied in the form of a software product. The software product may be stored on a storage medium and includes several instructions for enabling a computer device (which may be, for example, a personal computer, a server, or a network device) to execute all or part of the steps in the method according to any embodiment of the present application. The preceding storage medium includes a USB flash disk, a mobile hard disk, a read-only memory (ROM), a random access memory (RAM), a magnetic disk, an optical disk, or another medium capable of storing program codes.

What is claimed is:

1. An adaptive control electromagnetic induction energy harvesting method for a power transmission line, comprising:

acquiring a first electromagnetic induction electromotive force based on an electromagnetic induction energy harvesting device secured to the power transmission line, wherein the electromagnetic induction energy harvesting device comprises a magnetic core unit, a processor unit, a voltage protection unit, a filtering and rectification unit, a voltage conversion unit, an extension and retraction unit, and a coil unit, wherein the processor unit is connected to the extension and retraction unit, the filtering and rectification unit is connected to the voltage protection unit and the voltage conversion unit, the voltage protection unit is connected to the coil unit, the extension and retraction unit is secured to the magnetic core unit, the magnetic core unit is disposed in the coil unit, the processor unit is configured to transmit an extension and retraction control signal to the extension and retraction unit, and the extension and retraction unit is configured to control the magnetic core unit to perform extension or retraction in the coil unit based on the extension and retraction control signal to acquire an electromagnetic induction electromotive force;

in response to the first electromagnetic induction electromotive force being less than an operating electromagnetic induction electromotive force, controlling the electromagnetic induction energy harvesting device to adaptively control the magnetic core unit to perform extension or retraction in the coil unit based on the first electromagnetic induction electromotive force to obtain a second electromagnetic induction electromotive force;

performing filtering and rectification processing and voltage conversion processing on at least one of the first electromagnetic induction electromotive force or the second electromagnetic induction electromotive force to obtain an electromagnetic induction output voltage; and performing powering processing or charging processing on an electrical device based on the electromagnetic induction output voltage.

2. The adaptive control electromagnetic induction energy harvesting method for the power transmission line according to claim 1, wherein the magnetic core unit and the coil unit are both cylindrical in shape, the magnetic core unit comprises a first magnetic core subunit, a second magnetic core subunit, a magnetic core securing subunit, and a connection subunit, the magnetic core securing subunit is secured to the first magnetic core subunit, the second magnetic core subunit, and the connection subunit, and the connection subunit is disposed between the first magnetic core subunit and the second magnetic core subunit; the coil unit comprises a first coil subunit and a second coil subunit, and the voltage protection unit is connected to the first coil subunit and the second coil subunit.

3. The adaptive control electromagnetic induction energy harvesting method for the power transmission line according to claim 2, wherein acquiring the first electromagnetic induction electromotive force based on the electromagnetic induction energy harvesting device secured to the power transmission line comprises:

securing the electromagnetic induction energy harvesting device to the power transmission line by a securing unit;

transmitting, by the processor unit in the electromagnetic induction energy harvesting device, the extension and retraction control signal to the extension and retraction unit, and controlling, by the extension and retraction unit, the magnetic core unit to perform extension or retraction in the first coil subunit based on the extension and retraction control signal to acquire the first electromagnetic induction electromotive force, wherein an expression of the first electromagnetic induction electromotive force is as follows:

$$V_1 = \frac{N_1 \mu_1 S_1}{L_1} \times \omega i_{y1}$$

wherein $V_1$ denotes the first electromagnetic induction electromotive force, $N_1$ denotes a number of coil turns of the first coil subunit, $\mu_1$ denotes a magnetic permeability of the first magnetic core subunit, $S_1$ denotes an equivalent section area of the first coil subunit, $\omega$ denotes an angular velocity, $i_{y1}$ denotes an effective current value of the first coil subunit, and $L_1$ denotes a magnetic path length of a first coil magnetic core.

4. The adaptive control electromagnetic induction energy harvesting method for the power transmission line according to claim 2, wherein controlling the electromagnetic induction energy harvesting device to adaptively control the magnetic core unit to perform the extension or retraction in the coil unit based on the first electromagnetic induction electromotive force to obtain the second electromagnetic induction electromotive force comprises:

in response to the first electromagnetic induction electromotive force being less than the operating electromagnetic induction electromotive force, adaptively performing, by the electromagnetic induction energy harvesting device, voltage compensation processing based on the first electromagnetic induction electromotive force, determining, by the processor unit, a second coil extension control signal or a second coil retraction control signal based on a coil voltage signal and transmitting the second coil extension control signal or the second coil retraction control signal to the extension and retraction unit, and controlling, by the extension and retraction unit, the magnetic core unit to perform extension or retraction in the second coil subunit based on the second coil extension control signal or the second coil retraction control signal and make adaptive adjustment to obtain the second electromagnetic induction electromotive force, wherein an expression of the second electromagnetic induction electromotive force is as follows:

$$V_2 = \frac{N_2 \mu_2 S_2}{L_2} \times \omega i_{y2}$$

wherein $V_2$ denotes the second electromagnetic induction electromotive force, $N_2$ denotes a number of coil turns of the second coil subunit, $\mu_2$ denotes a magnetic permeability of the second magnetic core subunit, $S_2$ denotes an equivalent section area of the second coil subunit, $\omega$ denotes an angular velocity, $i_{y2}$ denotes an effective current value of the second coil subunit, and $L_2$ denotes a magnetic path length of a second coil magnetic core.

5. The adaptive control electromagnetic induction energy harvesting method for the power transmission line according to claim 2, wherein performing the filtering and rectification processing and the voltage conversion processing on the at least one of the first electromagnetic induction electromotive force or the second electromagnetic induction electromotive force to obtain the electromagnetic induction output voltage comprises:

in response to the first electromagnetic induction electromotive force being greater than or equal to the operating electromagnetic induction electromotive force, performing the filtering and rectification processing and the voltage conversion processing on the first electromagnetic induction electromotive force to obtain the electromagnetic induction output voltage;

in response to the first electromagnetic induction electromotive force being less than the operating electromagnetic induction electromotive force and the second electromagnetic induction electromotive force being greater than or equal to the operating electromagnetic induction electromotive force, disconnecting the first coil subunit and performing the filtering and rectification processing and the voltage conversion processing on the second electromagnetic induction electromotive force to obtain the electromagnetic induction output voltage; or in response to the first electromagnetic induction electromotive force and the second electromagnetic induction electromotive force being both less than the operating electromagnetic induction electromotive force, performing the filtering and rectification processing and the voltage conversion processing on a sum of the first electromagnetic induction electromotive force and the second electromagnetic induction electromotive force to obtain the electromagnetic induction output voltage.

6. The adaptive control electromagnetic induction energy harvesting method for the power transmission line according to claim 1, wherein performing the powering processing or the charging processing on the electrical device based on the electromagnetic induction output voltage comprises:

comparing the electromagnetic induction output voltage with a threshold voltage; and performing the powering processing or the charging processing based on a voltage comparison result, wherein performing the powering processing or the charging processing based on the voltage comparison result comprises:

in response to the electromagnetic induction output voltage being less than the threshold voltage, performing at least one of the following: charging an electrical energy storage unit or supplying power to the electrical device by using an electrical energy storage unit; or in response to the electromagnetic induction output voltage being greater than or equal to the threshold voltage, performing the powering processing on the electrical device.

7. An adaptive control electromagnetic induction energy harvesting system for a power transmission line, comprising an electromagnetic induction energy harvesting device and an analysis and control unit, wherein the electromagnetic induction energy harvesting device comprises a magnetic core unit, a processor unit, a voltage protection unit, a filtering and rectification unit, a voltage conversion unit, an extension and retraction unit, and a coil unit, wherein the processor unit is connected to the extension and retraction unit, the filtering and rectification unit is connected to the voltage protection unit and the voltage conversion unit, the voltage protection unit is connected to the coil unit, the extension and retraction unit is secured to the magnetic core unit, the magnetic core unit is disposed in the coil unit, the processor unit is configured to transmit an extension and retraction control signal to the extension and retraction unit, and the extension and retraction unit is configured to control the magnetic core unit to perform extension or retraction in the coil unit based on the extension and retraction control signal to acquire an electromagnetic induction electromotive force; and the analysis and control unit is configured to: acquire a first electromagnetic induction electromotive force based on the electromagnetic induction energy harvesting device secured to the power transmission line, in response to the first electromagnetic induction electromotive force being less than an operating electromagnetic induction electromotive force, control the electromagnetic induction energy harvesting device to adaptively control the magnetic core unit to perform extension or retraction in the coil unit based on the first electromagnetic induction electromotive force to obtain a second electromagnetic induction electromotive force, perform filtering and rectification processing and voltage conversion processing on at least one of the first electromagnetic induction electromotive force or the second electromagnetic induction electromotive force to obtain an electromagnetic induction output voltage, and perform powering processing or charging processing on an electrical device based on the electromagnetic induction output voltage.

8. The adaptive control electromagnetic induction energy harvesting system for the power transmission line according to claim 7, wherein the magnetic core unit and the coil unit are both cylindrical in shape, the magnetic core unit comprises a first magnetic core subunit, a second magnetic core subunit, a magnetic core securing subunit, and a magnetic core connection subunit, the magnetic core securing connection subunit is secured to the first magnetic core subunit, the second magnetic core subunit, and the magnetic core connection subunit, and the magnetic core connection subunit is disposed between the first magnetic core subunit and the second magnetic core subunit; the coil unit comprises a first coil subunit and a second coil subunit, and the voltage protection unit is connected to the first coil subunit and the second coil subunit.

9. The adaptive control electromagnetic induction energy harvesting system for the power transmission line according to claim 7, wherein the voltage conversion unit comprises a MAX5035 chip, a first capacitor, a second capacitor, a third capacitor, a fourth capacitor, a transistor, a first variable resistor, a second variable resistor, and an inductor, wherein pin 1 of the MAX5035 chip is connected to one terminal of the first capacitor, the other terminal of the first capacitor is connected to one terminal of the inductor, pin 8 of the MAX5035 chip, and a cathode of the transistor separately, an anode of the transistor is grounded, the other terminal of the inductor is connected to one terminal of the third capacitor, the other terminal of the third capacitor is grounded, pin 2 of the MAX5035 chip is connected to one terminal of the second capacitor, the other terminal of the second capacitor is connected to pin 3 of the MAX5035 chip, pin 7 of the MAX5035 chip is connected to one terminal of the second variable resistor, one terminal of the fourth capacitor, and the electrical device separately, pin 5 of the MAX5035 chip is connected to the other terminal of the second variable resistor and one terminal of the first variable resistor, and pin 6 of the MAX5035 chip, the other terminal of the first variable resistor, and the other terminal of the fourth capacitor are grounded.

10. The adaptive control electromagnetic induction energy harvesting system for the power transmission line according to claim 8, wherein the analysis and control unit is configured to acquire the first electromagnetic induction electromotive force based on the electromagnetic induction energy harvesting device secured to the power transmission line by:

securing the electromagnetic induction energy harvesting device to the power transmission line by a securing unit;

transmitting, by the processor unit in the electromagnetic induction energy harvesting device, the extension and retraction control signal to the extension and retraction unit, controlling, by the extension and retraction unit, the magnetic core unit to perform extension or retraction in the first coil subunit based on the extension and retraction control signal to acquire the first electromagnetic induction electromotive force, wherein an expression of the first electromagnetic induction electromotive force is as follows:

$$V_1 = \frac{N_1 \mu_1 S_1}{L_1} \times \omega i_{y1}$$

wherein $V_1$ denotes the first electromagnetic induction electromotive force, $N_1$ denotes a number of coil turns of the first coil subunit, $\mu_1$ denotes a magnetic permeability of the first magnetic core subunit, $S_1$ denotes an equivalent section area of the first coil subunit, $\omega$ denotes an angular velocity, $i_{y1}$ denotes an effective current value of the first coil subunit, and $L_1$ denotes a magnetic path length of a first coil magnetic core.

11. The adaptive control electromagnetic induction energy harvesting system for the power transmission line according to claim 8, wherein in response to the first electromagnetic induction electromotive force being less than the operating electromagnetic induction electromotive force, the electromagnetic induction energy harvesting device adaptively performs voltage compensation processing based on the first electromagnetic induction electromotive force, the processor unit determines a second coil extension control signal or a second coil retraction control signal based on a coil voltage signal and transmits the second coil extension control signal or the second coil retraction control signal to the extension and retraction unit, and the extension and retraction unit controls the magnetic core unit to perform extension or retraction in the second coil subunit based on the second coil extension control signal or the second coil retraction control signal and make adaptive adjustment to obtain the second electromagnetic induction electromotive force, wherein an expression of the second electromagnetic induction electromotive force is as follows:

$$V_2 = \frac{N_2 \mu_2 S_2}{L_2} \times \omega i_{y2}$$

wherein $V_2$ denotes the second electromagnetic induction electromotive force, $N_2$ denotes a number of coil turns of the second coil subunit, $\mu_2$ denotes a magnetic permeability of the second magnetic core subunit, $S_2$ denotes an equivalent section area of the second coil subunit, $\omega$ denotes an angular velocity, $i_{y2}$ denotes an effective current value of the second coil subunit, and L₂ denotes a magnetic path length of a second coil magnetic core.

12. The adaptive control electromagnetic induction energy harvesting system for the power transmission line according to claim 8, wherein the analysis and control unit is configured to perform the filtering and rectification processing and the voltage conversion processing on the at least one of the first electromagnetic induction electromotive force or the second electromagnetic induction electromotive force to obtain the electromagnetic induction output voltage by:

in response to the first electromagnetic induction electromotive force being greater than or equal to the operating electromagnetic induction electromotive force, performing the filtering and rectification processing and the voltage conversion processing on the first electromagnetic induction electromotive force to obtain the electromagnetic induction output voltage;

in response to the first electromagnetic induction electromotive force being less than the operating electromagnetic induction electromotive force and the second electromagnetic induction electromotive force being greater than or equal to the operating electromagnetic induction electromotive force, disconnecting the first coil subunit and performing the filtering and rectification processing and the voltage conversion processing on the second electromagnetic induction electromotive force to obtain the electromagnetic induction output voltage; or in response to the first electromagnetic induction electromotive force and the second electromagnetic induction electromotive force being both less than the operating electromagnetic induction electromotive force, performing the filtering and rectification processing and the voltage conversion processing on a sum of the first electromagnetic induction electromotive force and the second electromagnetic induction electromotive force to obtain the electromagnetic induction output voltage.

13. The adaptive control electromagnetic induction energy harvesting system for the power transmission line according to claim 9, wherein the analysis and control unit is configured to perform the powering processing or the charging processing on the electrical device based on the electromagnetic induction output voltage by:

comparing the electromagnetic induction output voltage with a threshold voltage, wherein an expression of a value of the threshold voltage is as follows:

$$V_m = \left(1 + \frac{R_2}{R_1}\right) \times V_{out}$$

wherein $V_m$ denotes the threshold voltage, $R_1$ denotes a resistance value of the first variable resistor in the voltage conversion unit, $R_2$ denotes a resistance value of the second variable resistor in the voltage conversion unit, and $V_{out}$ denotes a preset output voltage value; and performing the powering processing or the charging processing based on a voltage comparison result, wherein performing the powering processing or the charging processing based on the voltage comparison result comprises:

in response to the electromagnetic induction output voltage being less than the threshold voltage, performing at least one of the following: charging an electrical energy storage unit or supplying power to the electrical device by using an electrical energy storage unit; or in response to the electromagnetic induction output voltage being greater than or equal to the threshold voltage, performing the powering processing on the electrical device.

\* \* \* \* \*